United States Patent Office 3,322,683
Patented May 30, 1967

3,322,683
AQUEOUS BARIUM CARBONATE DISPERSIONS, PROCESS FOR THEIR PRODUCTION, AND DRY PRE-MIX
Fred F. Lester, Cartersville, Ga., assignor to Chemical Products Corporation, Cartersville, Ga., a corporation of Georgia
No Drawing. Filed Nov. 2, 1961, Ser. No. 149,507
15 Claims. (Cl. 252—313)

This invention relates to an improved barium carbonate product which may readily be dispersed in aqueous systems and to stable aqueous barium carbonate dispersions so formed. More particularly, the invention relates to aqueous dispersions of barium carbonate which, by reason of their fluidity, high density and stability, are readily usable in industrial processes wherein lumping of $BaCO_3$, clogging of equipment therewith, and similar mechanical difficulties routinely have characterized the addition of barium carbonate.

In numerous industrial processes, the presence of water-soluble sulfates presents a problem. For example, it is often desirable to remove sulfates from salt brines. As a further example, water-soluble sulfates are most undesirable in ceramic products because they migrate to the product surfaces and form a "scum." In both of these instances and many others wherein the presence of sulfates is a problem, it has long been known that the addition of barium carbonate will efficaciously remove the sulfates as insoluble barium sulfate. In the ceramic industry the addition of as little as five pounds of barium carbonate per ton of mix is often sufficient to eliminate "scumming" entirely (and "scumming" has often been responsible for rejection of 15 to 20% of the final product of a ceramic operation).

On an industrial scale, however, the employment of barium carbonate often presents problems almost as burdensome as those that it solves. Ordinary commercial grades of barium carbonate are not free flowing. They compact readily, bridge in hoppers, and clog feeding devices and "settle out" in aqueous systems. Moreover, they cannot be fed regularly into a system without the continuous attention of an operator. In ceramic processes, for example, they form lumps which are difficulty, if at all, dispersible in the clay mix. Most of the industrial processes in which barium carbonate is desirably employed require that only minute amounts, in proportion to the other ingredients present, be added. In order to achieve a uniform dispersion of barium carbonate in a semi-solid plastic system, it has often been necessary to add a large excess—an expedient which adds considerably to the cost of the process.

It has been proposed to solve the barium carbonate problem in numerous ways. Certain additives have been tried to render barium carbonate free-flowing and non-lumping. For example, addition of 10% of a synthetic magnesium silicate produces a "fluffed" product which is moderately satisfactory when freshly prepared; after storing it for any appreciable period, however, its desirable properties diminish so that it "lumps" and becomes difficult to feed. Barium carbonate having inherently free-flowing qualities, by reason of its crystal structure, has been produced and at least two such materials are known. One of these has larger than average crystals; it has the disadvantage of being considerably less reactive than normal, so that more than twice as much as usual is necessary to the accomplishment of any desired result. The other of these has much smaller than average crystals and, while desirably reactive, is of very low bulk density and, hence, unusable from a practical viewpoint in most of the currently installed industrial feeders.

It has been further proposed to add barium carbonate as a water slurry to various industrial systems. In most instances, this has proved unfeasible because barium carbonate is so heavy that, in the absence of continuous high speed agitation both in the slurry preparation zone and in the pipeline through which it is fed, it settles out almost instantaneously. Moreover, about one pound of $BaCO_3$ per three pounds of water is a practical limit of concentration. Thus, for example, if it is desired to add $BaCO_3$ to clay mixes in ceramic manufacture, the slurry method introduces far more water than the system can tolerate and still remain in a semi-solid plastic state suitable for extrusion, molding or drying. Accordingly, the addition of $BaCO_3$ in aqueous slurry or suspension has found little, if any, industrial acceptance.

It is an object of this invention to provide a highly reactive, stable barium carbonate product.

Another object is to provide stable aqueous barium carbonate dispersions.

Still another object is the provision of aqueous barium carbonate dispersions containing as little as one part of water for each four parts of barium carbonate.

A further object is the provision of a barium carbonate product which can be uniformly dispersed with ease in clay mixes and other semi-solid plastic systems without the necessity of adding objectionably large volumes of water.

Yet another object is the provision of barium carbonate aqueous dispersions which are "pumpable" for very long periods without agitation, so that they can be shipped and stored in the dispersed state.

Still a further object is the provision of an aqueous barium carbonate dispersion of such high density that it occupies less space than the same weight of dry solid $BaCO_3$, thus enhancing its shipping and storage qualities.

An additional object is the provision of a substantially dry $BaCO_3$ pre-mix which readily can be formed into a stable aqueous dispersion by the simple expedient of adding water and agitating.

A further object is the provision of a process for making stable, fluid $BaCO_3$ dispersions of high density.

These and other objects of this invention are achieved by the selection of a barium carbonate of critical particle-size range and critical reactivity value and adding to it conventional dispersants and/or protective colloids.

Generally described, the essence of this invention lies in the discovery that certain types of barium carbonate of limited particle-size range and reactivity (which possibly depends in part on particle shape) can be dispersed in water by very small quantities of cheap and conventional dispersing agents. Moreover, if a protective colloid is also added to the dispersion so produced, it can be stabilized for a period of weeks or months without agitation. The operable size range of barium carbonate particles is from about 0.25 micron to about 2.0 microns. A particle size between 0.5 and 1.25 micron is particularly preferred. In this range, determination of particle size is extremely difficult. While the use of the electron microscope in defining such small particle sizes has progressed very far in recent years, barium carbonate is completely opaque to the electron beam and, furthermore, is intensely aggregated by ordinary drying procedures. Therefore, "average particle size" as used in this application is, unless otherwise specified, defined by a dye absorption method developed by Kolthoff and MacNevior and set forth in J. Am. Chem. Soc. 59, 1639–1643 (1937), which method is based on the absorption of wool violet dye by the particles.

The barium carbonate particles which may be employed to form dispersions according to this invention, must also have a reactivity of at least about 65%. As used in this application, "reactivity" is defined as that percent of barium carbonate which will react with an excess of calcium sulfate, present as an 80% saturated (at room temperature) solution, within a 24-hour period when subjected to a gentle boil under reflux.

Barium carbonate is frequently produced commercially by the interaction of barium sulfide and carbon dioxide or sodium carbonate. Whene so produced, it is flocculated or aggregated to a considerable degree even after drying and strenuous grinding. The coarse crystalline barium carbonate which is produced by the interaction of carbon dioxide with barium sulfhydrate or by the interaction of carbon dioxide and barium sulfide in a countercurrent flow reactor does not flocculate but forms in very large particles. It appears that the physical properties of barium carbonate, both in its dry state and in the conventional aqueous slurries of the prior art are a function of the size of the aggregates rather than of the ultimate size of the individual particles or crystals which make up the aggregates.

If barium carbonate aggregates can be deflocculated to their ultimate particles or crystals and, hence, are able to demonstrate the physical properties characteristic of their very fine ultimate particle size, the behavior of barium carbonate in an aqueous dispersion is completely unlike its ordinary behavior in aqueous slurries. Thus, ordinary dispersants will act to deflocculate some barium carbonate aggregates to crystal sizes at which they will form stable dispersions according to the invention.

The dispersants which operate to break up certain barium carbonate aggregates and to disperse particles thereof within the critical size range are those conventional dispersing agents which do not themselves flocculate barium carbonate in aqueous systems. Thus, for example, the alkali metal mahogany sulfonates, which contain a large non-polar hydrophobic group attached to a comparatively small hydrophilic group have a flocculating effect upon aqueous barium carbonate systems; this is true of all similarly constituted conventional dispersants. If, however, the dispersant molecule is mainly hydrophilic in character, whether cationic, anionic or nonionic, it will produce a stable homogeneous aqueous dispersion of barium carbonate. Thus, operable dispersants include many conventional water-softeners, such as the alkali metal and ammonium phosphates, including metaphosphates, pyrophosphates, polyphosphates, etc., the lignosulfonate soaps, the lignin-containing by-products of paper manufacture, cellulose purification and similar processes, etc. Also useful are those anionic, cationic and nonionic surfactants which are characterized by highly hydrophilic behavior, e.g. poly (oxy) alkylenes, polyalcohols, poly (oxyalkylene) amines, amides, sulfates, phosphates, thiols, alcohols, carboxylates, etc. Numerous other operable dispersants will readily occur to those skilled in the art. Accordingly, the term "dispersant" as used in this application connotes those conventional dispersants which are hydrophilic in behavior when placed in aqueous systems.

When the dispersions are to be shipped or stored for long periods, it is also advantageous to incorporate in them a protective colloid to enhance their stability. As with the dispersants, the suitable protective colloids are the various materials known in the art for such purpose. Examples of such materials include bentonite, cellulose gums such as carboxymethyl cellulose, hydroxyethyl cellulose, carboxymethylhydroxyethyl cellulose, etc., starches, proteins such as gelatin, albumin, etc., vegetable gums such as gum arabic, gum kharaya, gum ghatti, locust bean gum, gum tragacanth, etc., dextrin, Irish moss, methyl cellulose, water-soluble synthetic resins such as polyvinyl alcohol, polyvinylpyrrolidone, and the like.

Moreover, as will be appreciated, certain materials may function both as a dispersing agent and as a protective colloid. Notable among these are starches, vegetable gums and cellulose gums.

While there are no critical criteria for additives theoretically other than that they must exhibit a hydrophilic behavior overall, from a practical point of view some dispersants and colloids will be more desirable than others with respect to cost, resistance to bacterial attack, resistance to hydrolysis, etc. It is, of course, possible to tailor the additives to the nature of the system to which it is desired to add the $BaCO_3$. Thus, if the product is to be used in systems where phosphates are undesirable organic dispersants and modifiers may be used. Similarly, polyphosphates, bentonite and $BaCl_2$ are particularly suitable additives when it is desired to employ the $BaCO_3$ in ceramic fluxes. As a further example, if it is desired to employ the dispersions to remove sulfate from products ultimately intended for medicinal purposes or human consumption, edible starches and gums are desirable additives.

The manner of mixing the barium carbonate with the dispersant and/or protective colloid chosen is not critical. The ingredients can be admixed in a substantially dry state and stored that way until it is desired to form a dispersion. Alternatively, they can be admixed with water simultaneously or separately, in any order, and the mixture agitated to produce a stable dispersion. When it is desired to achieve a substantially dry pre-mix, the quantities of additive necessary to achieve the desired result according to the invention are so small that it is entirely possible and in fact it is contemplated that liquid or aqueous dissolved additive may be sprayed on or into the dry material.

One of the many striking properties of $BaCO_3$ dispersions produced according to this invention is that they exhibit enhanced reactivity with sulfates as compared to non-dispersed barium carbonate particles of the same 0.25 to 2.0 micron particle size.

Another amazing feature of the $BaCO_3$ dispersions of the invention is that they occupy less cubic volume per pound of carbonate than even the most dense and non-reactive dry $BaCO_3$. Thus, a dispersion containing 80% solids and produced according to this invention had a $BaCO_3$ content of 130 pounds dry weight per cubic foot of dispersion. This amount of $BaCO_3$ when dry occupies two cubic feet. Thus, 87 tons (dry weight) of $BaCO_3$ could, in dispersed form, be carried in a single 10,000 gallon tank car. Accordingly, it is clear that many economic advantages would accrue from shipping, storing and handling the material in dispersed form. Initial drying of $BaCO_3$ following its preparation would be unnecessary. Bags for storing dry material could be eliminated, as could manual handling. Instead, bulk $BaCO_3$ suspensions could be shipped and stored in tanks and pumped out as needed. Obviously, such dispersions, since they maintain their fluidity for months, are readily meterable and require little or no agitation during storage or pumping.

Having generally described the invention, the following examples are given by way of specific illustration:

Example 1

To 1,000 grams of partially dried filter cake containing 720 grams, dry basis, of a $BaCO_3$ having an average particle size of about 1.0 micron and a reactivity of about 85% there was added one gram of Calgon (a commercial sodium polymetaphosphate water softener). The mixture was stirred with a spatula for one minute, whereupon it became a creamy fluid. The fluid was then stirred for one minute with a commercial malted milk mixer at low speed, after which 10 grams of Milgel (a commercial bentonite clay) was added and stirring was continued for three minutes at high speed. The resultant dispersion cnotained 2.4 pounds of $BaCO_3$ per pound of water and had the consistency of thin cream. After many weeks, it was still fluid. The reactivity of the dispersed carbonate was 89%.

Example 2

Two grams of Calgon, 3 grams of bentonite and one gram of barium chloride are stirred in water for two minutes with a malted milk mixer at high speed. To this is added slowly with continuous stirring 800 grams of barium carbonate of average particle size about 1.0 micron and having a reactivity of about 85%. The resulting fluid mixture is stirred for three minutes at high speed. The product is of the consistency of cream, has a specific gravity of 2.56, weight 21.4 pounds per gallon, and contains 17 pounds of barium carbonate per gallon. After many weeks standing, it will thicken slightly but may be easily restirred to its original consistency. The barium chloride in this example contributes to mitigating the thickening effect of the bentonite.

*Example 3*

1,000 grams of a filter cake or paste containing 30% by weight water and $BaCO_3$ as described in Example 1 is stirred slowly with 20 grams of Polyfon F (a commercial lignosulfonate containing by-product of cellulose purification). To this is added 200 grams of dry barium carbonate of the type used in Example 2, giving a final percent solids of about 75% $BaCO_3$. The resultant creamlike mixture is mixed at high speed for two minutes and 3 grams of bentonite are added and stirred in at high speed for two additional minutes. The resultant dispersion is slightly amber in color, and has the consistency of heavy cream. It shows a bare trace of free water after several weeks standing and can be freely pumped.

*Example 4*

To 1,000 grams of a filter cake or paste containing 75% solids and $BaCO_3$ as described in Example 1 is added 2 grams of Calgon with slow speed stirring. To the thin liquid suspension resulting is added, with high speed stirring, 10 grams of sodium carboxymethylcellulose. The resulting creamy fluid demonstrates little or no settling after many weeks standing and remains freely pumpable after minimal agitation.

*Example 5*

750 grams of dry barium carbonate of the type described in Example 2 are roughly mixed with 2 grams of Calgon and 5 grams of bentonite. The resulting mixture is added to 250 grams of water over a period of about two minutes, the water being agitated at high speed with the malted milk mixer during the addition and for three minutes thereafter. The dispersion was a thin liquid with no apparent settling after 24 hours.

*Example 6*

A dry mixture was prepared as in Example 5 substituting 5 grams of sodium carboxymethylcellulose for both Calgon and bentonite. Water was admixed therewith as in Example 5, and the resultant dispersion was a thick cream liquid with no apparent settling after many days.

*Example 7*

Antigyp, a commercial brand of $BaCO_3$ marketed by Chicago Copper and Chemical Company and having a particle size range according to the dye absorption test of about 3 to about 7 microns and a reactivity of about 35 to 55%, was examined under the light microscope and found to consist of coarse, irregular crystals, some being as large as 30 microns in size. This material, despite its low reactivity, is widely accepted commercially because it is a relatively free-flowing solid and can be fed into industrial systems with relative ease. When it was attempted to prepare a dispersion by the method described in Example 2, a tough rubbery suspension was obtained; it rapidly stalled the malted milk mixer. Moreover, after standing for one hour, the $BaCO_3$ settled to a hard, high solid cake which could not be reagitated to a suspension without great difficulty.

*Example 8*

Another commercial $BaCO_3$ product, Ceramix BT, marketed by Pittsburgh Plate Glass Company, which has an average particle size of about 5 microns and a reactivity of 37%, was subjected to the conditions of Example 2. The results were similar to those described in Example 7.

*Example 9*

Still another commercial brand of $BaCO_3$ Ceramix, also marketed by Pittsburgh Plate Glass Company, was subjected to the conditions of Example 2. This material has an effective particle size of about 0.9 micron and a reactivity of about 85%. When examined under the light microscope, the product exhibits scattering properties and is poorly resolved. Under the electron microscope, the material appears to be composed of aggregates and clusters of spicular crystals with considerable spherulitic material. The aqueous dispersion of this material was a fluid, stable composition similar to that prepared in Example 2.

*Example 10*

Barium carbonate sold by Sherwin-Williams Company under the name "75-C" was subjected to the conditions of Example 4; no fluid mix could be produced with this relatively small amount of water.

The same brand of $BaCO_3$ was then treated as in Example 2. It was found that by adding the solid to the aqueous phase in very small increments with intervening relatively long periods of high speed agitation, a stable fluid mix could be achieved.

The average particle size of this material, according to the dye absorption method, is 1.5 to 2.0 microns, and it possesses a reactivity of 65 to 75%. Thus, such material is on the upper borderline of operability with respect to average particle size and reactivity.

*Example 11*

Microflo, a barium carbonate produced by Chemical Products Corporation and characterized by a reactivity of about 85% and an average particle size according to the dye absorption test of 0.25 to 0.35 micron, was treated as set forth in Example 2. The product obtained was a very thick dispersion of such fluidity as to exhibit "borderline" pumpability. A dispersion prepared as in Example 2 but at somewhat lower concentration, however, has very good fluidity characteristics and is free from any tendency to settle.

The fluidity, low-water content and ultimately fine particle size of the dispersed phase, which characterize the aqueous $BaCO_3$ dispersions of this invention as exemplified above, make possible a perfection of mixing never previously attainable in industrial processes where barium carbonate is to be employed.

In addition to those uses already mentioned, and to the many obvious uses to which the stable aqueous barium carbonate dispersions of this invention can be put, it is envisioned that they may find application as ballast for heavy vehicle tires (particularly in road compacting machinery), in the loading of rubber latices and aqueous dispersions of synthetic organic plastics, as acidity controllers for disperse aqueous systems and for emulsion polymers prepared in such systems, etc. It is also contemplated that the fine mixing properties of the barium carbonate dispersions of this invention may be utilized in applications wherein it is desired to employ barium carbonate as a major reactive ingredient. To exemplify, in the preparation of barium titanate (e.g. for piezoelectrics and high frequency insulators) it is advantageous to add titanium dioxide to a dispersion such as instantly contemplated, thus effecting co-dispersibility and uniformity of reaction not previously achieved without great difficulty. Such is also true in the preparation of barium ferrite.

Still further, it is contemplated that the instant dispersions, in view of their low water content, could be used as a "dip" for pottery, thereby forming a uniform coating which on firing would react with silicates in the substrate to produce a stable, adherent, uniform glaze.

It will be recognized that in certain industrial applications of the dispersions of the invention, it will be advantageous to include various modifying agents, the nature of which will be conditioned upon the particular industrial use. To exemplify, barium chloride is added to systems containing bentonite to stabilize the suspensions against thickening on standing, caused by the presence of soluble alkaline earth metal ions in natural waters. Antifreezes, such as lower alcohols and alkylene glycols, may be added to dispersions which are to be shipped or used under low temperature conditions. Bacteriostats are desirable modifiers when starches or other additives subject to bacterial degradation are present.

The amount of dispersant and/or protective colloid needed will, of course, vary with the particular substances chosen and with the concentration of BaCO₃ desired to be achieved in the dispersion. In general, the total amount of additives employed will not exceed 2% by weight based on the weight of BaCO₃ to be dispersed. The word "minute" in this application is intended to define quantities of additives of such order of magnitude.

What is claimed is:

1. A stable, fluid, highly dense composition of matter particularly adapted for use in clay mixes, semi-solid plastic systems and other media to which the addition of large volumes of water is objectionable, said composition exhibiting the property of remaining "pumpable" for long periods without agitation, said composition containing as essential active ingredients
    (1) a major amount of barium carbonate, having
        (a) an average particle size of from about 0.25 to about 2.0 microns as determined according to the dye absorption method, and
        (b) a "reactivity" of at least about 75%, "reactivity" being defined as the percentage of said barium carbonate which will react with an excess of calcium sulfate, present as an 80% saturated solution at room temperature, within a 24-hour period when subjected to a gentle boil under reflux;
    (2) a minor amount of water, and
    (3) an amount sufficient to disperse the barium carbonate in said water, but not exceeding about 2% by weight of the barium carbonate present, of a dispersant characterized by a markedly hydrophilic behavior in aqueous systems.

2. A composition of matter as described in claim 1 in which the barium carbonate has an average particle size of from about 0.50 to about 1.25 micron.

3. A composition of matter as described in claim 1 in which the barium carbonate has an average particle size of about 1.0 micron.

4. A composition of matter as described in claim 1 in which at least two pounds of barium carbonate on a dry weight basis are present per pound of water.

5. A composition of matter as described in claim 1 in which said dispersant additionally acts as a protective colloid to enhance the storage stability of the composition.

6. A composition as described in claim 1 which contains in addition to said dispersant, a separate protective colloid which acts to enhance the storage stability of the composition, such separate protective colloid being present in an amount such that the sum total of dispersant and protective colloid does not exceed about 2% by weight of barium carbonate present.

7. A substantially dry solid pre-mix containing as essential ingredients
    (1) barium carbonate having
        (a) an average particle size of from about 0.25 to about 2.0 microns as determined according to the dye absorption method, and
        (b) a "reactivity" of at least about 75%, "reactivity" being defined as the percentage of said barium carbonate which will react with an excess of calcium sulfate, present as an 80% saturated solution at room temperature, within a 24-hour period when subjected to a gentle boil under reflux, and
    (2) an amount sufficient to disperse the barium carbonate in a minor amount of water, but not exceeding about 2% by weight of the barium carbonate present, of a dispersant characterized by a markedly hydrophilic behavior in aqueous systems, said pre-mix having the property, when admixed in major amount with a minor amount of water and agitated of forming a stable, fluid, highly dense dispersion, said dispersion being particularly adapted for use in clay mixes, semi-solid plastic systems and other media to which the addition of large volumes of water is objectionable, said dispersion further exhibiting the property of remaining "pumpable" for long periods without agitation.

8. A substantially dry solid pre-mix as described in claim 7 in which the average particle size of the barium carbonate is from about 0.50 to about 1.25 micron.

9. A substantially dry solid pre-mix as described in claim 7 in which the dispersant employed is capable of acting, in aqueous dispersion, as a protective colloid to enhance the storage stability of the aqueous dispersion.

10. A substantially dry solid pre-mix as described in claim 7, containing in addition to said dispersant, a separate protective colloid characterized by a markedly hydrophilic behavior in aqueous systems, said separate protective colloid being present in an amount such that the sum of dispersant and protective colloid does not exceed about 2% by weight based on the weight of the barium carbonate.

11. A process for producing a stable, fluid, highly dense composition of matter particularly adapted for use in clay mixes, semi-solid plastic systems and other media to which the addition of large volumes of water is objectionable, which composition exhibits the property of remaining "pumpable" for long periods without agitation, which process comprises the essential steps of admixing
    (1) a major amount of barium carbonate, having
        (a) an average particle size of from about 0.25 to about 2.0 microns as determined according to the dye absorption method, and
        (b) a "reactivity" of at least about 75%, "reactivity" being defined as the percentage of said barium carbonate which will react with an excess of calcium sulfate, present as an 80% saturated solution at room temperature, within a 24-hour period when subjected to a gentle boil under reflux;
    (2) a minor amount of water, and
    (3) an amount sufficient to disperse the barium carbonate in said water but not exceeding about 2% by weight of the barium carbonate present, of a dispersant characterized by a markedly hydrophilic behavior in aqueous systems, and agitating the mixture so formed.

12. A process as described in claim 11 in which the average particle size of the barium carbonate is from about 0.50 to about 1.25 micron.

13. A process as described in claim 11 in which at least two pounds of barium carbonate, on a dry weight basis, is admixed per pound of water employed.

14. A process as described in claim 11 in which the said dispersant additionally acts as a protective colloid to enhance the storage stability of the composition formed.

15. A process as described in claim 11 in which there is additionally admixed, with agitation, a separate protective colloid characterized by a markedly hydrophilic behavior in aqueous system which protective colloid acts to enhance the storage stability of the composition formed, said protective colloid being added in an amount such that the sum total of protective colloid and dispersant present does not exceed about 2% by weight of the barium carbonate present.

(References on following page)

References Cited

UNITED STATES PATENTS

| | | | |
|---|---|---|---|
| 1,345,306 | 6/1920 | Achieson | 252—313 |
| 1,969,242 | 8/1934 | Szequari | 252—313 |
| 2,133,759 | 10/1938 | Vail et al. | 252—313 X |
| 2,177,269 | 10/1939 | Sullivan | 23—66 |
| 2,211,796 | 8/1940 | Schneider | 23—66 |
| 2,296,066 | 9/1942 | Sloan | 106—308 |
| 2,440,601 | 4/1948 | Dickerman | 252—313 X |
| 2,639,268 | 5/1953 | Heiss | 252—313 |
| 2,900,266 | 8/1959 | Shaver | 252—313 X |

FOREIGN PATENTS 405,391  2/1934  Great Britain.

OTHER REFERENCES

Collin: "Methods of Using Barium for Scum-Prevention in Stiff-Mud Brick" in Investigations in Ceramics and Road Materials, Dept. of Mines, Canada No. 690, 1926, pp. 5–7.

LEON D. ROSDOL, *Primary Examiner*.

JOSEPH R. LIBERMAN, ALBERT T. MEYERS, *Examiners*.

R. E. HUTZ, R. D. LOVERING, *Assistant Examiners*.